United States Patent
Malapati et al.

(10) Patent No.: US 10,723,301 B2
(45) Date of Patent: Jul. 28, 2020

(54) AIRBAG FOR RETRACTABLE STEERING WHEEL

(71) Applicant: Ford Global Technologies, LLC, Dearborn, MI (US)

(72) Inventors: Srinivas Reddy Malapati, Novi, MI (US); Ramakrishna Jingade, Farmington Hills, MI (US); Matt Alan Niesluchowski, Clarkston, MI (US); Krishnakanth E. Aekbote, Novi, MI (US); Alison Callaghan, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 78 days.

(21) Appl. No.: 16/045,423

(22) Filed: Jul. 25, 2018

(65) Prior Publication Data
US 2020/0031304 A1    Jan. 30, 2020

(51) Int. Cl.
| | |
|---|---|
| *B60R 21/2338* | (2011.01) |
| *B60R 21/203* | (2006.01) |
| *B60R 21/01* | (2006.01) |
| *B60R 21/00* | (2006.01) |
| *B60R 21/02* | (2006.01) |
| *B60R 21/239* | (2006.01) |

(52) U.S. Cl.
CPC ...... *B60R 21/2035* (2013.01); *B60R 21/2338* (2013.01); *B60R 21/01* (2013.01); *B60R 21/239* (2013.01); *B60R 2021/0004* (2013.01); *B60R 2021/0233* (2013.01); *B60R 2021/23382* (2013.01); *B60R 2021/23384* (2013.01)

(58) Field of Classification Search
CPC .......................................... B60R 2021/23384
See application file for complete search history.

(56) References Cited

U.S. PATENT DOCUMENTS

| | | | | |
|---|---|---|---|---|
| 5,887,894 A | * | 3/1999 | Castagner | B60R 21/217 280/735 |
| 6,832,778 B2 | * | 12/2004 | Pinsenschaum | B60R 21/233 280/739 |
| 7,354,064 B2 | * | 4/2008 | Block | B60R 21/23 280/739 |
| 7,552,942 B2 | * | 6/2009 | Fischer | B60R 21/2338 280/734 |
| 7,784,828 B2 | * | 8/2010 | Matsu | B60R 21/233 280/739 |

(Continued)

FOREIGN PATENT DOCUMENTS

| | | | | |
|---|---|---|---|---|
| DE | 102014018877 A1 | | 6/2016 | |
| JP | 2007216943 A | * | 8/2007 | ......... B60R 21/2338 |
| WO | WO-2017212839 A1 | * | 12/2017 | ........... B60R 21/203 |

*Primary Examiner* — Nicole T Verley
(74) *Attorney, Agent, or Firm* — Frank A. MacKenzie; Bejin Bieneman PLC

(57) ABSTRACT

A restraint system includes a retractable steering wheel, an airbag inflatable from the steering wheel, two primary tethers, two secondary tethers, and a tether release engaged with both secondary tethers. The airbag when inflated includes a front panel adjacent the steering wheel and an impact panel opposite the front panel. The primary tethers extend from the front panel to the impact panel. The secondary tethers extend from the front panel to each primary tether.

16 Claims, 6 Drawing Sheets

(56) References Cited

U.S. PATENT DOCUMENTS

| | | | |
|---|---|---|---|
| 8,020,891 B2* | 9/2011 | Fukawatase | B60R 21/2338 280/739 |
| 8,408,585 B2* | 4/2013 | Paxton | B60R 21/2338 280/728.2 |
| 9,650,011 B1* | 5/2017 | Belwafa | B60R 21/233 |
| 2002/0036400 A1 | 3/2002 | Winters et al. | |
| 2004/0012180 A1* | 1/2004 | Hawthorn | B60R 21/233 280/739 |
| 2005/0225065 A1* | 10/2005 | Fujll | B60R 21/233 280/743.2 |
| 2006/0284404 A1 | 12/2006 | Green et al. | |
| 2007/0205591 A1* | 9/2007 | Bito | B60R 21/233 280/743.2 |
| 2010/0109306 A1 | 5/2010 | Dong et al. | |
| 2010/0133798 A1* | 6/2010 | Fukawatase | B60R 21/2338 280/743.2 |
| 2012/0242070 A1 | 9/2012 | Paxton et al. | |
| 2014/0300094 A1 | 10/2014 | Williams | |
| 2018/0304844 A1* | 10/2018 | Nagasawa | B60R 21/01554 |

* cited by examiner

AIRBAG FOR RETRACTABLE STEERING WHEEL

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
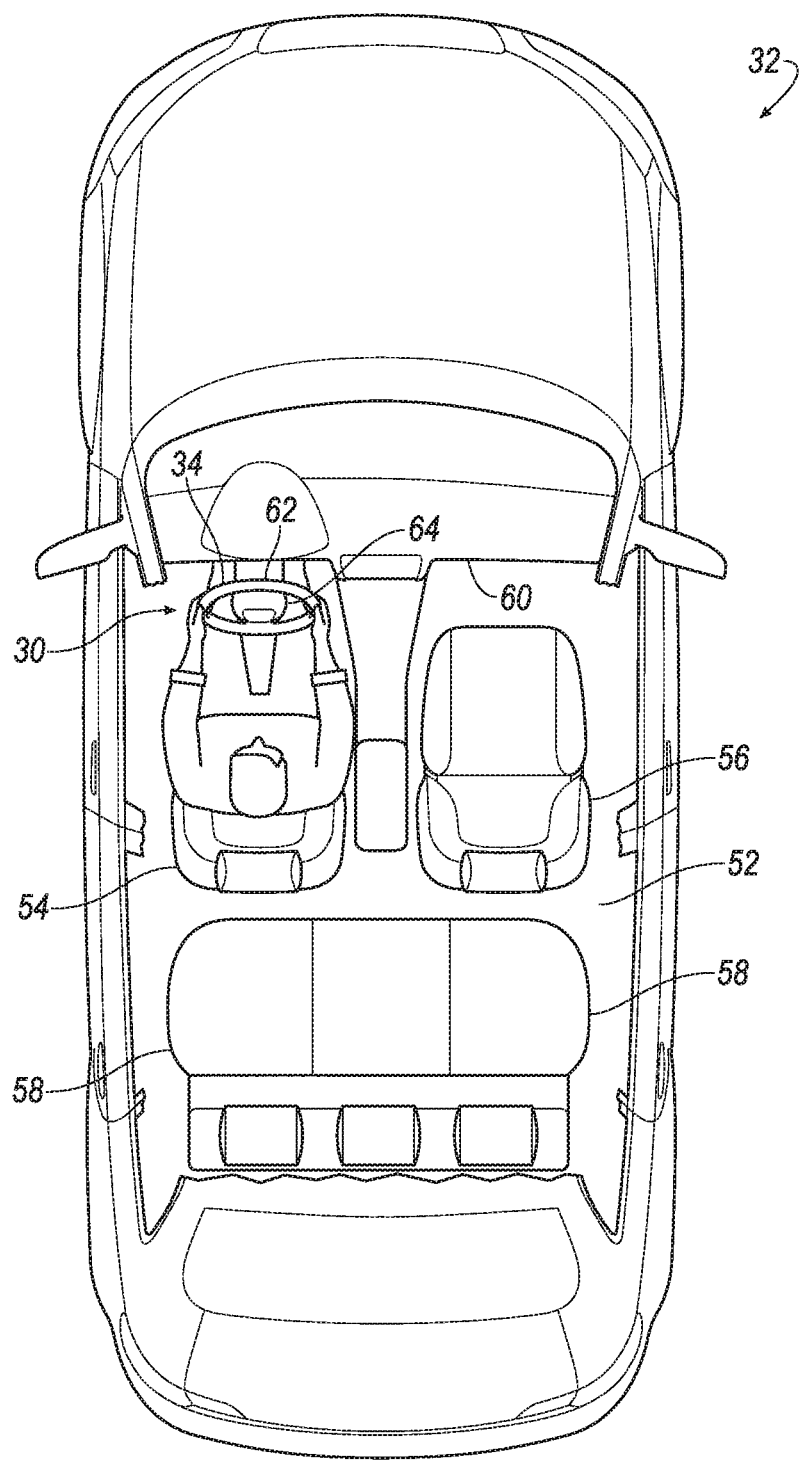
FIG. 1 is a top view of a vehicle with a passenger cabin exposed for illustration.

A restraint system includes a retractable steering wheel, an airbag inflatable from the steering wheel, two primary tethers, two secondary tethers, and a tether release engaged with both secondary tethers. The airbag when inflated includes a front panel adjacent the steering wheel and an impact panel opposite the front panel. The primary tethers extend from the front panel to the impact panel. The secondary tethers extend from the front panel to each primary tether.

The steering wheel may be movable between a retracted position and an extended position. The restraint system may further include a controller in communication with the tether release and programmed to instruct the tether release to release the secondary tethers in response to an impact based on the steering wheel being in the retracted position. The controller may be further programmed to prevent the tether release from releasing the secondary tethers in response to an impact based on the steering wheel being in the extended position.

The restraint system may further include an instrument panel, and the steering wheel in the retracted position may contact the instrument panel.

The restraint system may further include an intermediate tether extending from one of the primary tethers to the other of the primary tethers. The secondary tethers may be attached to the primary tethers at the same positions as the intermediate tether is attached to the primary tethers.

The front panel may include a vent. A first primary tether of the primary tethers may be operably attached to the vent. The vent may be open when the first primary tether is under tension above a threshold and closed when the first primary tether is under tension below the threshold.

The vent may be open when the secondary tethers are released and closed when the secondary tethers are unreleased.

The vent may be a first vent, the front panel may include a second vent, and a second primary tether of the primary tethers may be operably attached to the second vent.

The vent may be an active vent.

The distance from the steering wheel rearward to the farthest point of the impact panel may be longer when the secondary tethers are released than when the secondary tethers are unreleased.

The secondary tethers may be between the two primary tethers.

With reference to the Figures, a restraint system 30 for a vehicle 32 includes a retractable steering wheel 34, an airbag 36 inflatable from the steering wheel 34, two primary tethers 38, 40, two secondary tethers 42, 44, and a tether release 46 engaged with both secondary tethers 42, 44. The airbag 36 when inflated includes a front panel 48 adjacent the steering wheel 34 and an impact panel 50 opposite the front panel 48. The primary tethers 38, 40 extend from the front panel 48 to the impact panel 50. The secondary tethers 42, 44 extend from the front panel 48 to each primary tether 38, 40.

The restraint system 30 can provide an adjusted depth of inflation of the airbag 36 based on the position of the steering wheel 34. Thus, when the steering wheel 34 is retracted, the airbag 36 can have a longer depth of inflation and can reduce a distance that the occupant travels during an impact before contacting the airbag 36. When the steering wheel 34 is extended, the airbag 36 can have a shorter depth of inflation and can reduce a likelihood of the occupant contacting the airbag 36 before the airbag 36 is fully inflated. Other features described below can make the stiffness of the airbag 36 adjustable based on the position of the steering wheel 34.

With reference to FIG. 1, the vehicle 32 includes a passenger cabin 52 to house occupants, if any, of the vehicle 32. The passenger cabin 52 includes a driver seat 54 and a passenger seat 56 disposed at a front of the passenger cabin 52 and one or more back seats 58 disposed behind the driver and passenger seats 54, 56. The driver seat 54 is aligned in a longitudinal direction, i.e., a vehicle-forward direction, with the steering wheel 34. The passenger cabin 52 may also include third-row seats (not shown) at a rear of the passenger cabin 52. In FIG. 1, the driver and passenger seats 54, 56 are shown as bucket seats and the back seats 58 as a bench seat, but the seats 54, 56, 58 may be other types. The position and orientation of the seats 54, 56, 58 and components thereof may be adjustable by an occupant.

An instrument panel 60 may be disposed at a forward end of the passenger cabin 52 and face toward the driver and passenger seats 54, 56. The instrument panel 60 may include vehicle controls, such as the steering wheel 34; gauges, dials, and information displays; heating and ventilation equipment; a radio and other electronics; etc.

Figure 2:
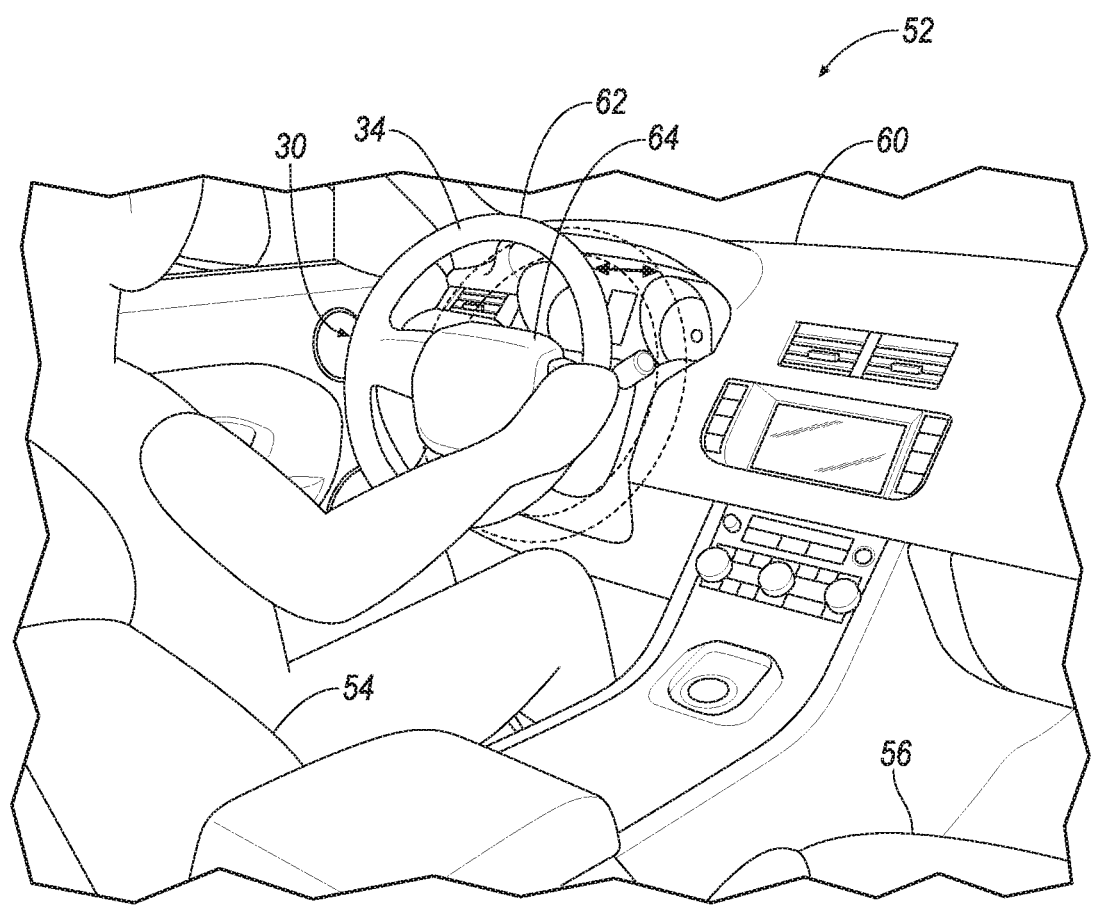
FIG. 2 is a perspective view of the passenger cabin of the vehicle.

With reference to FIG. 2, the steering wheel 34 is rotatably coupled to the instrument panel 60 facing the driver seat 54. The steering wheel 34 is rotatable about an axis A to provide input to the steering wheel 34. The steering wheel 34 includes a steering-wheel rim 62, which has a circular shape, and a steering-wheel body 64, which couples the steering-wheel rim 62 to the instrument panel 60.

The steering wheel 34 is retractable. In other words, the steering wheel 34 is movable between a retracted position and an extended position. The steering wheel 34 may be movable between the retracted position and the extended position axially along the axis A. The steering wheel 34 in the retracted position contacts the instrument panel 60. The steering wheel 34 in the extended position is spaced from the instrument panel 60. A linear actuator or the like (not shown) may be positioned in the instrument panel 60 and movably coupled to the steering wheel 34 to move the steering wheel 34 between the retracted and extended positions. In addition to being movable between the retracted position and the extended position, the steering wheel 34 may be ergonomically adjustable, i.e., an occupant may adjust the location of the extended position of the steering wheel 34 relative to the instrument panel 60.

Figure 4:
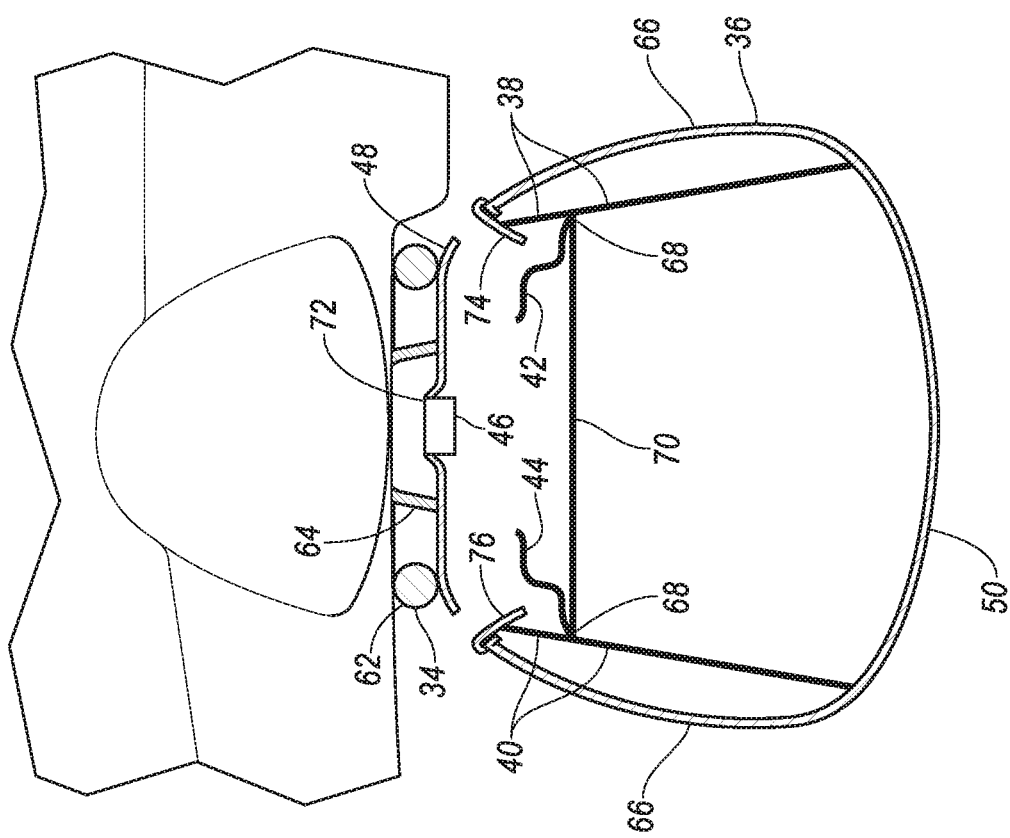
FIG. 4 is a cross-sectional side view of the steering wheel with the airbag in a second inflated position.
Figure 3:
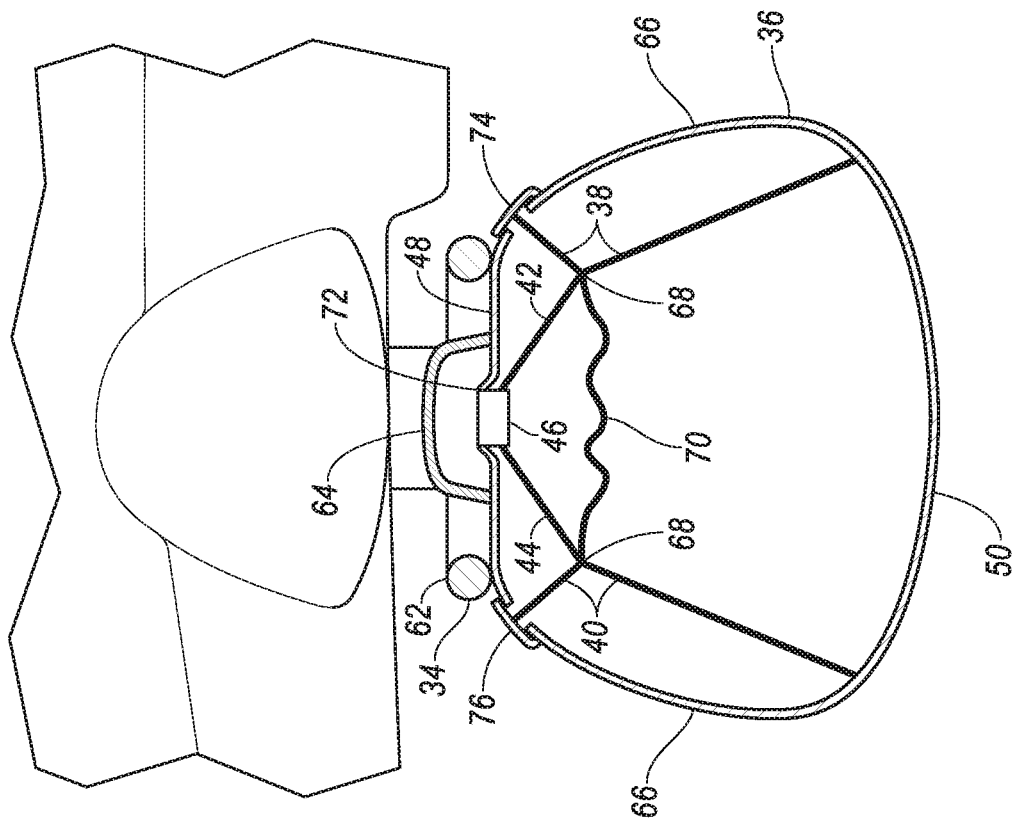
FIG. 3 is a cross-sectional side view of a steering wheel with an airbag in a first inflated position.

With reference to FIGS. 3 and 4, the airbag 36 is inflatable from the steering wheel 34 from an uninflated position to either a first or a second inflated position. The airbag 36 in the uninflated position is housed in the steering wheel 34, e.g., in the steering-wheel body 64. The airbag 36 in either inflated position extends from the steering wheel 34 in a vehicle-rearward direction toward the driver seat 54. As described below, the airbag 36 is inflatable to a first inflated position, as shown in FIG. 3, or to a second inflated position, as shown in FIG. 4.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

In the inflated position, the airbag 36 includes the front panel 48 adjacent the steering wheel 34, the impact panel 50 opposite the front panel 48, and a side panel 66 connecting the front panel 48 and the impact panel 50. The front panel 48 faces in a generally vehicle-forward direction. The front panel 48 contacts and extends outside of the steering-wheel rim 62. The impact panel 50 faces in a generally rearward direction and faces the driver seat 54. The side panel 66 extends circumferentially about the front panel 48 and the impact panel 50 and extends from the front panel 48 to the impact panel 50.

Fabric pieces (not shown) that constitute the airbag 36 may or may not correspond to the front panel 48, impact panel 50, and side panel 66. For example, more than one fabric piece may constitute the front panel 48, the impact panel 50, or the side panel 66. For another example, a single fabric piece may at least partially constitute more than one of the front panel 48, the impact panel 50, and the side panel 66; e.g., a single fabric piece constitutes the front panel 48 and part of the side panel 66, and another single fabric piece constitutes the impact panel 50 and the rest of the side panel 66.

The two primary tethers 38, 40 extend from the front panel 48 to the impact panel 50. The primary tethers 38, 40 are attached, e.g., sewn, to the front panel 48 and to the impact panel 50. Relative to an axis of rotation defined by the steering wheel 34, the primary tethers 38, 40 may be approximately 180° apart. For example, a first primary tether 38 may be straight up from the axis of rotation, and a second primary tether 40 may be straight down from the axis of rotation, colloquially, at twelve o'clock and six o'clock relative to the steering wheel 34. For another example, as shown in FIGS. 3 and 4, the first primary tether 38 may be straight right from the axis of rotation, and the second primary tether 40 may be straight left from the axis of rotation, colloquially, at three o'clock and nine o'clock relative to the steering wheel 34.

The secondary tethers 42, 44 each extend from the front panel 48 to one of the primary tethers 38, 40. A first secondary tether 42 extends from the front panel 48 to the first primary tether 38, and a second secondary tether 44 extends from the front panel 48 to the second primary tether 40. The secondary tethers 42, 44 may be attached to or at the tether release 46. The secondary tethers 42, 44 may be attached, e.g., sewn to, clamped by, looped around, etc., a component at the front panel 48, e.g., the tether release 46. The secondary tethers 42, 44 may be attached to the primary tethers 38, 40 at midpoints 68 of the primary tethers 38, 40, and the midpoints 68 are spaced from ends of the primary tethers 38, 40, i.e., are spaced from the front panel 48 and the impact panel 50.

The tether release 46 is engaged with both secondary tethers 42, 44. The tether release 46 is disposed at the front panel 48. The tether release 46 may be disposed in the steering-wheel body 64. The tether release 46 may be disposed in a hole 72 of the front panel 48. The airbag 36 may be anchored to the steering-wheel body 64 at the hole 72. The tether release 46 is positioned to release both of the secondary tethers 42, 44 at once. For the purposes of this disclosure, "release" (verb) is defined as uncoupling from the steering wheel 34. For example, the tether release 46 may free, detach, sever, etc. the secondary tethers 42, 44, as described in more detail below.

An intermediate tether 70 extends from one of the primary tethers 38, 40 to the other of the primary tethers 38, 40. The intermediate tether 70 may increase the stability and uniformity of the shape of the airbag 36. The intermediate tether 70 may be attached to the primary tethers 38, 40 at the same positions as the secondary tethers 42, 44 are attached to the primary tethers 38, 40, i.e., at the midpoints 68. That way, the same sewing may connect the primary tether 38, 40, secondary tether 42, 44, and intermediate tether 70 at each midpoint 68.

Fabric pieces (not shown) that constitute the tethers 38, 40, 42, 44, 70 may or may not correspond to the primary tethers 38, 40, secondary tethers 42, 44, and intermediate tether 70. For example, more than one fabric piece may constitute each primary tether 38, 40, secondary tether 42, 44, and intermediate tether 70. For another example, a single fabric piece may at least partially constitute more than one of the primary tether 38, 40, secondary tether 42, 44, and intermediate tether 70 across each midpoint 68; e.g., a single fabric piece may constitute the secondary tether 42, 44 and the primary tether 38, 40 from the midpoint 68 to the impact panel 50; a single fabric piece may constitute both secondary tethers 42, 44; etc.

The airbag 36 is inflatable from the uninflated position to a first inflated position or to a second inflated position. In the first inflated position, the secondary tethers 42, 44 are intact; i.e., the tether release 46 has not released the secondary tethers 42, 44. When the airbag 36 is in the first inflated position, the secondary tethers 42, 44 hold the primary tethers 38, 40 inward toward the axis of rotation, and the intermediate tether 70 is longer than the distance between the midpoints 68 and is therefore slack. In the second inflated position, the secondary tethers 42, 44 are disconnected; i.e., the tether release 46 has released the secondary tethers 42, 44. When the airbag 36 is in the second inflated position, the intermediate tether 70 is in tension between the primary tethers 38, 40 and is held taut. The distance from the steering wheel 34 rearward to the farthest point of the impact panel 50 is longer when the airbag 36 is in the second inflated position than when the airbag 36 is in the first inflated position. In other words, the distance from the steering wheel 34 rearward to the farthest point of the impact panel 50 is longer when the secondary tethers 42, 44 are released than when the secondary tethers 42, 44 are unreleased. The distance that the airbag 36 inflates as measured rearward from the instrument panel 60 is approximately equal between when the steering wheel 34 is in the retracted position and the airbag 36 is in the second inflated position, as shown in FIG. 4, and when the steering wheel 34 is in the extended position and the airbag 36 is in the first inflated position, as shown in FIG. 3.

The front panel 48 may include a vent 74, 76 at the end of one or both of the primary tethers 38, 40, e.g., a first vent 74 at the end of the first primary tether 38 and a second vent 76 at the end of the second primary tether 40. The first primary tether 38 is attached to the first vent 74, and the second primary tether 40 is attached to the second vent 76. The vents 74, 76 may be spaced from the steering wheel 34. For example, the vents 74, 76 may be spaced outside the steering-wheel rim 62, as shown in FIGS. 3 and 4. For another example, the vents 74, 76 may be located between the steering-wheel rim 62 and the steering-wheel body 64 and spaced from the steering-wheel rim 62 and from the steering-wheel body 64.

The vents 74, 76 may be active vents. The primary tethers 38, 40 may be operably attached to the vents 74, 76, i.e., attached in such a way as to open and/or close the vents 74, 76 according to the state of the primary tethers 38, 40. For example, each vent 74, 76 may be open when the respective primary tether 38, 40 is under tension above a threshold and closed when the respective primary tether 38, 40 is under tension below the threshold. The threshold may be calibrated so that the primary tethers 38, 40 are under tension below the threshold when the airbag 36 is in the first inflated position, i.e., when the secondary tethers 42, 44 are released, and the primary tethers 38, 40 are under tension above the threshold when the airbag 36 is in the second inflated position, i.e., when the secondary tethers 42, 44 are unreleased. For example, each vent 74, 76 may include a vent flap positioned outside and covering a vent hole when the airbag 36 is in the uninflated position, and each primary tether 38, 40 is sewn to the respective vent flap. The vent flap and vent hole are sized so that tension in the respective primary tether 38, 40 must exceed the threshold before the vent flap is pulled through the vent hole, exposing the vent hole. For another example, each vent 74, 76 may include a vent hole and stitching sewing the vent hole shut, and the collective tensile strength of the stitching corresponds to a tension in the respective primary tether 38, 40 equal to the threshold.

Figure 5:
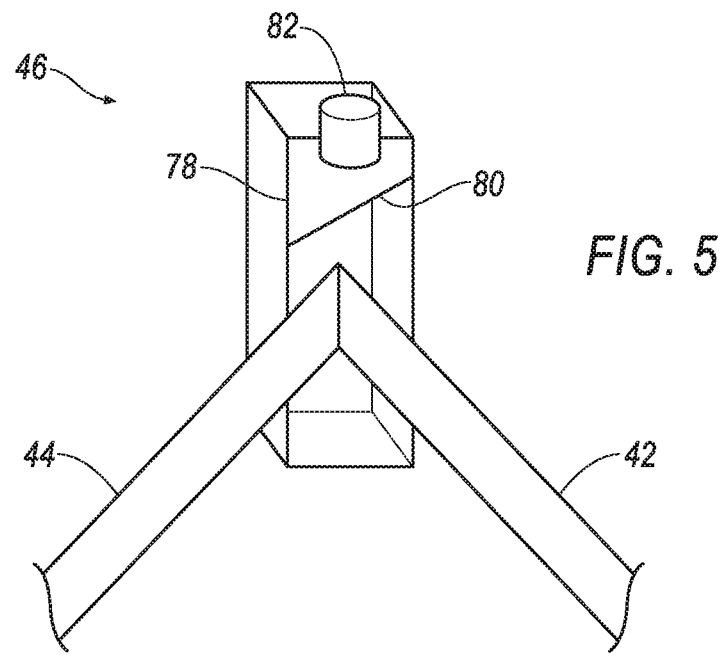
FIG. 5 is a perspective view of a first example tether release of the airbag.

With reference to FIG. 5, the tether release 46 may be a cutter 78 positioned to sever the secondary tethers 42, 44. The cutter 78 may have a sharp edge 80 directed at the secondary tethers 42, 44 and a mechanism such as a firing pin 82 for driving the sharp edge 80 toward the secondary tethers 42, 44. The sharp edge 80 may be sharp enough to slice the secondary tethers 42, 44.

Figure 6:
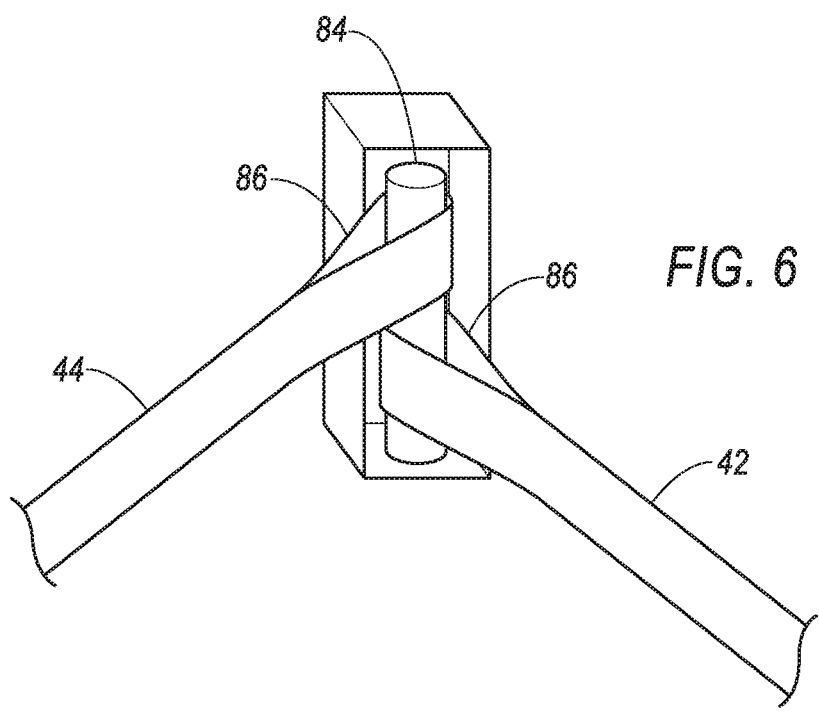
FIG. 6 is a perspective view of a second example tether release of the airbag.

With reference to FIG. 6, the tether release 46 may be a release pin 84 coupling the secondary tethers 42, 44 to the steering-wheel body 64. The secondary tethers 42, 44 may each have a loop 86 extending around the release pin 84. When the release pin 84 discharges, the release pin 84 jettisons out of the loops 86 and no longer holds the secondary tethers 42, 44.

Figure 7:
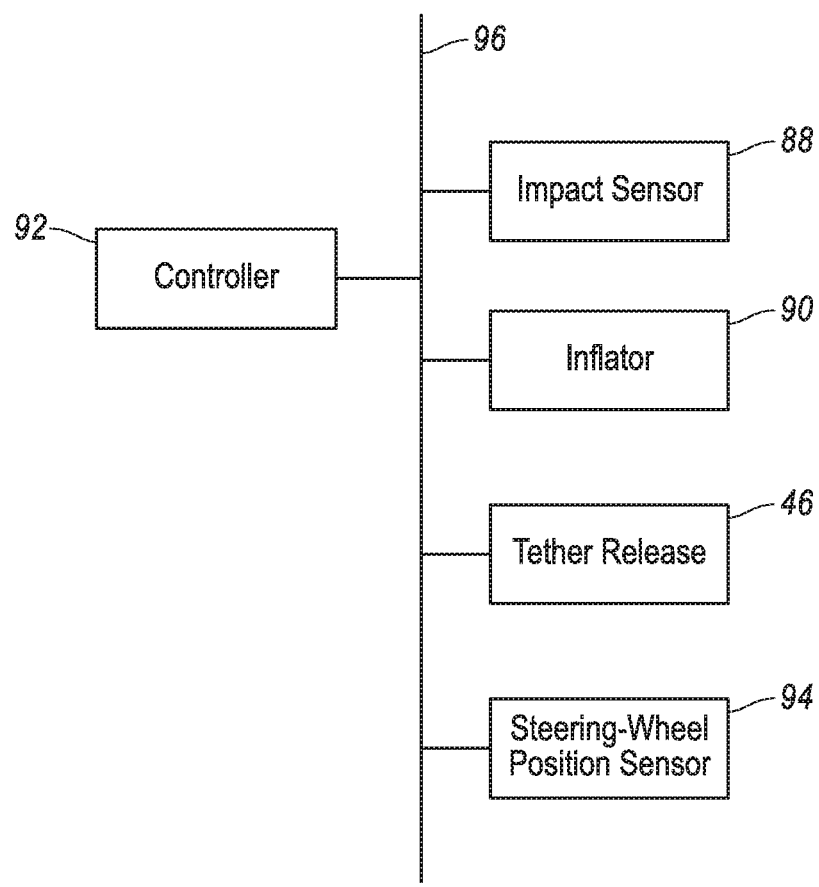
FIG. 7 is a block diagram of a control system of the airbag.

With reference to FIG. 7, an impact sensor 88 is adapted to detect an impact to the vehicle 32. The impact sensor 88 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 88 may be located at numerous points in or on the vehicle 32.

An inflator 90 may be connected to the airbag 36. Upon receiving a signal from, e.g., a controller 92, the inflator 90 may inflate the airbag 36 with an inflatable medium, such as a gas. The inflator 90 may be, for example, a pyrotechnic inflator that uses a chemical reaction to drive inflation medium to the airbag 36. The inflator 90 may be of any suitable type, for example, a cold-gas inflator.

A steering-wheel position sensor 94 may be coupled to the steering wheel 34. The steering-wheel position sensor 94 may be any sensor providing an output mapping onto a linear position of steering wheel 34 between the retracted position and the extended position, e.g., a capacitive transducer, a capacitive displacement sensor, an eddy-current sensor, an ultrasonic sensor, a Hall effect sensor, an inductive noncontact position sensor, a linear variable differential transformer, a piezoelectric transducer, a potentiometer, a proximity sensor, a linear coder, a string potentiometer, etc. The steering-wheel position sensor 94 may output data indicating a distance of the steering wheel 34 from the instrument panel 60, or the steering-wheel position sensor 94 may output binary data indicating whether the steering wheel 34 is less than a distance threshold from the instrument panel 60.

The controller 92 is a microprocessor-based controller. The controller 92 includes a processor, memory, etc. The memory of the controller 92 includes memory for storing instructions executable by the processor as well as for electronically storing data and/or databases. The controller 92 may be, e.g., a restraint control module. The controller 92 may be in communication with and may control other airbags, seatbelt pretensioners, etc. in the vehicle 32, among other functions.

The controller 92 may transmit and receive data through a communications network 96 such as a controller area network (CAN) bus, Ethernet, WiFi, Local Interconnect Network (LIN), onboard diagnostics connector (OBD-II), and/or by any other wired or wireless communications network. The controller 92 may be communicatively coupled to the impact sensor 88, the inflator 90, the tether release 46, the steering-wheel position sensor 94, and other components via the communications network 96.

Figure 8:
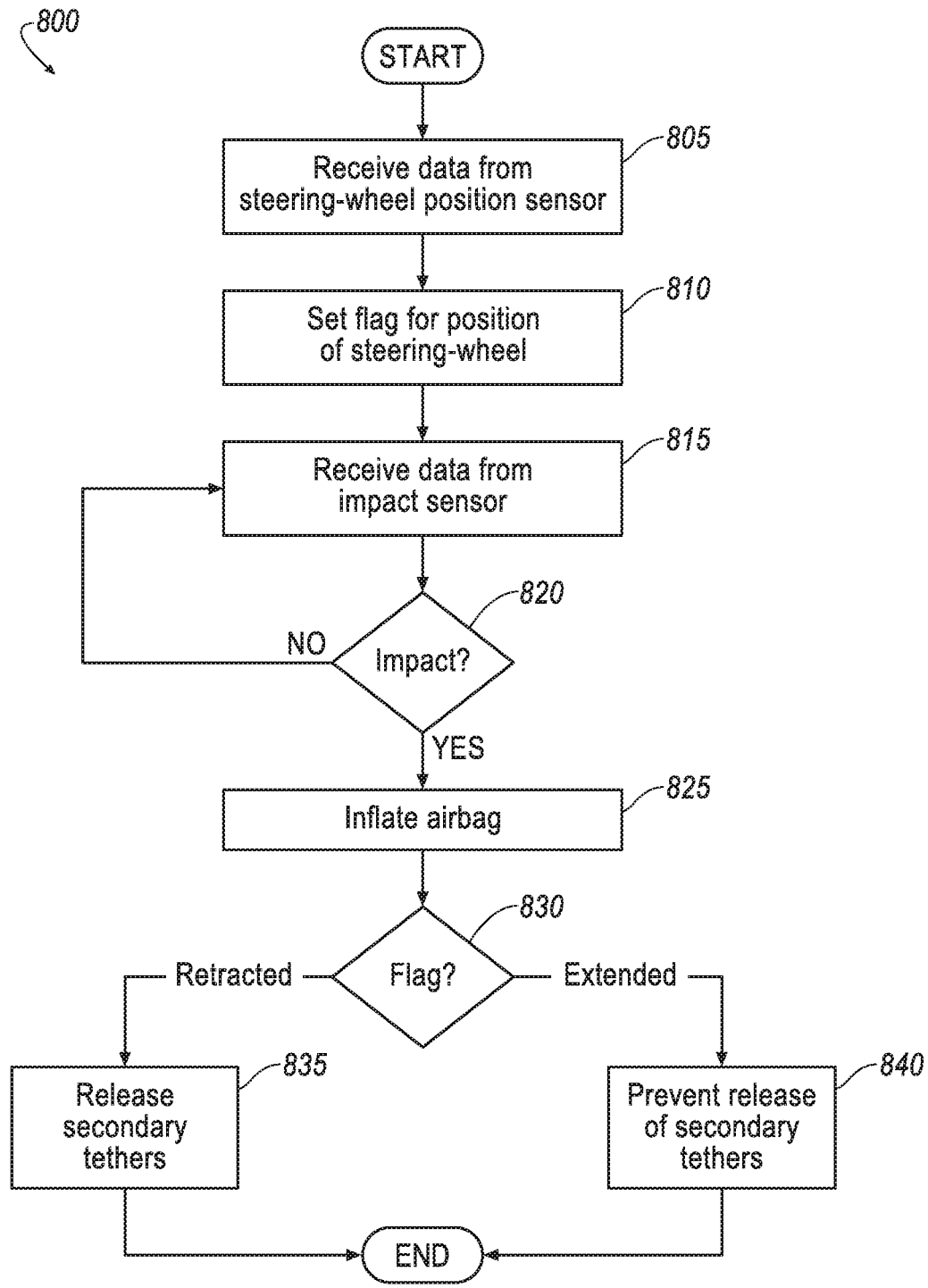
FIG. 8 is a process flow diagram illustrating an exemplary process for controlling the airbag.

FIG. 8 is a process flow diagram illustrating an exemplary process 800 for controlling the airbag 36. The memory of the controller 92 stores executable instructions for performing the steps of the process 800. In general, the process 800 inflates the airbag 36 to the first inflated position in response to an impact based on the steering wheel 34 being in the extended position and inflates the airbag 36 to the second inflated position in response to an impact based on the steering wheel 34 being in the retracted position.

The process 800 begins in a block 805, in which the controller 92 receives data from the steering-wheel position sensor 94 indicating the position of the steering wheel 34 via the communications network 96. The data may indicate a distance from the instrument panel 60 or may be binary data indicating whether the steering wheel 34 is less than the distance threshold from the instrument panel 60. The distance threshold may be chosen to correspond to the steering wheel 34 being in the retracted position. Alternatively, the controller 92 may receive data indicating a command for the steering wheel 34 to move to the extended or retracted position, and store the intended position in memory.

Next, in a block 810, the controller 92 sets a flag storing in memory whether the steering wheel 34 is in the retracted position. For example, the flag may equal 1 when the steering wheel 34 is in the retracted position and 0 when the steering wheel 34 is in the extended position. The flag may be set based on the value of the binary data or based on whether the distance data is above the distance threshold.

Next, in a block 815, the controller 92 receives data from the impact sensor 88 via the communications network 96.

Next, in a decision block 820, the controller 92 determines whether an impact to the vehicle 32 has occurred or is imminent based on the data from the impact sensor 88. If an impact has not occurred and is not imminent, the process 800 returns to the block 815 to continue monitoring for an impact.

If an impact has occurred or is imminent, next, in a block 825, the controller 92 instructs the inflator 90 to inflate the airbag 36 via the communications network 96.

Next, in a decision block 830, the controller 92 checks the value of the flag, i.e., determines whether the steering wheel 34 is in the retracted position or in the extended position. If the value of the flag is 0, i.e., if the steering wheel 34 is in the extended position, the process 800 proceeds to a block 840.

If the value of the flag is 1, i.e., if the steering wheel 34 is in the retracted position, next, in a block 835, the controller 92 instructs the tether release 46 to release the secondary tethers 42, 44. The airbag 36 inflates to the second inflated position, i.e., inflates farther rearward from the steering wheel 34 than in the first inflated position. The tension of the primary tethers 38, 40 opens the vents 74, 76, making the airbag 36 softer than in the first inflated position. The momentum of the occupant of the driver seat 54 may push the occupant into the airbag 36, and the airbag 36 may cushion the occupant. After the block 835, the process 800 ends.

After the decision block 830, if the value of the flag is 0, i.e., if the steering wheel 34 is in the extended position, in a block 840, the controller 92 prevents the tether release 46 from releasing the secondary tethers 42, 44. The airbag 36 inflates to the first inflated position, i.e., inflates less far rearward from the steering wheel 34 than in the second inflated position. The vents 74, 76 remain closed, making the airbag 36 stiffer than in the second inflated position. The momentum of the occupant of the driver seat 54 may push the occupant into the airbag 36, and the airbag 36 may cushion the occupant. The comparatively higher stiffness of the airbag 36 may stop the occupant from traveling across the comparatively shorter distance to the steering wheel 34. After the block 840, the process 800 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A restraint system comprising:
a retractable steering wheel;
an airbag inflatable from the steering wheel, the airbag when inflated including a front panel adjacent the steering wheel and an impact panel opposite the front panel;
two primary tethers extending from the front panel to the impact panel;
a secondary tether extending from the front panel to each primary tether;
a tether release engaged with both secondary tethers; and
an intermediate tether extending from one of the primary tethers to the other of the primary tethers, the intermediate tether spaced from the front panel and from the impact panel.

2. The restraint system of claim 1, wherein the steering wheel is movable between a retracted position and an extended position.

3. The restraint system of claim 2, further comprising a controller in communication with the tether release and programmed to instruct the tether release to release the secondary tethers in response to an impact based on the steering wheel being in the retracted position.

4. The restraint system of claim 3, wherein the controller is further programmed to prevent the tether release from releasing the secondary tethers in response to an impact based on the steering wheel being in the extended position.

5. The restraint system of claim 2, further comprising an instrument panel, wherein the steering wheel in the retracted position contacts the instrument panel.

6. The restraint system of claim 1, wherein the secondary tethers are attached to the primary tethers at the same positions as the intermediate tether is attached to the primary tethers.

7. The restraint system of claim 1, wherein the front panel includes a vent.

8. The restraint system of claim 7, wherein a first primary tether of the primary tethers is operably attached to the vent.

9. The restraint system of claim 8, wherein the vent is open when the first primary tether is under tension above a threshold and closed when the first primary tether is under tension below the threshold.

10. The restraint system of claim 8, wherein the vent is open when the secondary tethers are released and closed when the secondary tethers are unreleased.

11. The restraint system of claim 8, wherein the vent is a first vent, the front panel includes a second vent, and a second primary tether of the primary tethers is operably attached to the second vent.

12. The restraint system of claim 7, wherein the vent is an active vent.

13. The restraint system of claim 1, wherein the distance from the steering wheel rearward to the farthest point of the impact panel is longer when the secondary tethers are released than when the secondary tethers are unreleased.

14. The restraint system of claim 1, wherein the secondary tethers are between the two primary tethers fewer.

15. The restraint system of claim 1, wherein the intermediate tether is directly connected only to the primary tethers.

16. The restraint system of claim 1, wherein the intermediate tether is spaced from the airbag.

* * * * *